United States Patent
Seki

(10) Patent No.: US 9,379,861 B2
(45) Date of Patent: Jun. 28, 2016

(54) RADIO BASE STATION APPARATUS, RADIO TERMINAL APPARATUS AND WIRELESS COMMUNICATION METHOD

(75) Inventor: Yuta Seki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 194 days.

(21) Appl. No.: 13/395,593

(22) PCT Filed: Sep. 13, 2010

(86) PCT No.: PCT/JP2010/005575
§ 371 (c)(1),
(2), (4) Date: Mar. 12, 2012

(87) PCT Pub. No.: WO2011/030561
PCT Pub. Date: Mar. 17, 2011

(65) Prior Publication Data
US 2012/0172076 A1 Jul. 5, 2012

(30) Foreign Application Priority Data
Sep. 14, 2009 (JP) ................................ 2009-212261

(51) Int. Cl.
*H04L 5/00* (2006.01)
*H04B 7/02* (2006.01)
(Continued)

(52) U.S. Cl.
CPC .............. *H04L 5/0035* (2013.01); *H04B 7/024* (2013.01); *H04B 7/0658* (2013.01); *H04W 24/10* (2013.01); *H04W 28/06* (2013.01); *H04W 88/06* (2013.01)

(58) Field of Classification Search
None
See application file for complete search history.

(56) References Cited

U.S. PATENT DOCUMENTS

| 6,130,907 A * | 10/2000 | Chen ...................... H04B 1/707 |
| | | 324/76.19 |
| 2005/0111484 A1* | 5/2005 | Obata .......................... 370/465 |

(Continued)

FOREIGN PATENT DOCUMENTS

| CN | 101166073 | 4/2008 |
| JP | 2003-023381 | 1/2003 |

(Continued)

OTHER PUBLICATIONS

Kusashima et al, Fractional BS Cooperation, 2009, ids.*

(Continued)

*Primary Examiner* — Ping Hsieh
*Assistant Examiner* — James Yang
(74) *Attorney, Agent, or Firm* — Dickinson Wright PLLC

(57) ABSTRACT

A radio base station apparatus wherein even when a single-base-station transmission and a plural-base-station cooperative transmission are implemented at the same time, the terminal-to-base-station feedback information amount and the inter-cell interference (ICI) can be reduced. A base station uses a first transmission mode, in which only the base station implements a signal transmission, and a second transmission mode, in which the base station implements a cooperative signal transmission together with another radio base station apparatus, to communicate with one or more radio terminal apparatuses. A setting unit sets, as a particular frequency band whose reception quality is to be measured, one of first and second frequency bands that are parts of a band used for communication with the terminals. A deciding unit decides, as the transmission mode for the terminals, one of the first and second transmissions based on the reception quality of the particular frequency band.

9 Claims, 7 Drawing Sheets

(51) Int. Cl.
*H04B 7/06* (2006.01)
*H04W 24/10* (2009.01)
*H04W 28/06* (2009.01)
*H04W 88/06* (2009.01)

(56) References Cited

U.S. PATENT DOCUMENTS

| | | |
|---|---|---|
| 2007/0026813 A1 | 2/2007 | Khan |
| 2009/0069026 A1 | 3/2009 | Cho |
| 2009/0291691 A1* | 11/2009 | Jeong et al. .......... 455/450 |
| 2011/0103339 A1* | 5/2011 | Kim et al. ............ 370/329 |

FOREIGN PATENT DOCUMENTS

| | | |
|---|---|---|
| JP | 2007-166118 | 6/2007 |
| JP | 2008-104184 | 5/2008 |

OTHER PUBLICATIONS

International Search Report dated Nov. 9, 2010.
A. Negate, et al., "Throughput Improvement by Power Reallocation in Multi-cell Coordinated Power Control," IEICE Technical Report, RCS2008-162, vol. 108, No. 358, Dec. 11, 2008, 7 pages total.
N. Kusashima, et al., "Fractional Base Station Cooperation Cellular Network," IEICE Technical Report, RCS2008-226, Mar. 2009, pp. 83-88.
T. Yamamoto, et al., "A Study of the Effect of Power, Timing, and Frequency Offset Differences on Multi-Site Cooperative MIMO Systems," IEICE Technical Report, RCS2008-225, Mar. 2009, pp. 77-82.
Extended European Search Report dated Feb. 29, 2016.

* cited by examiner

RADIO BASE STATION APPARATUS, RADIO TERMINAL APPARATUS AND WIRELESS COMMUNICATION METHOD

TECHNICAL FIELD

The present invention relates to a radio base station apparatus, a radio terminal apparatus, and a radio communication method.

BACKGROUND ART

In a cellular system represented by a cellular phone, a cell refers to a range in which a radio base station apparatus (hereinafter, simply referred to as a base station (BS)) can communicate with a radio terminal apparatus (hereinafter, simply referred to as a mobile station (MS) or user equipment (UE)), that is, a range (communication area) that the base station covers. In the cellular system, the communication area is extensively expanded by disposing a plurality of base stations.

In the cellular system, the same frequencies are repeatedly used between the cells to efficiently utilize finite frequency resources. For example, in the cellular system, a system band is divided into N frequency bands, and the N frequency bands are used in such a manner that the same frequency is not used by N adjacent cells (N-cell repetition use).

In the N-cell repetition use, the larger N is, the larger the distance between cells using the same frequency is. Therefore, an influence of inter-cell interference (ICI) between adjacent cells becomes smaller. However, the larger N is, the smaller the frequency bandwidth (that is, system bandwidth/N) usable in one cell is. That is, the magnitude of the ICI and the frequency bandwidth usable in one cell are in a trade-off relation.

For example, in order to build a broadband system such as the long term evolution (LTE) which is being standardized in a standard organization, 3rd generation partnership project (3GPP), it is desirable to use one-cell repetition use (that is, N=1) for which the frequency bandwidth usable in one cell is the maximum. That is, in the LTE, the ICI has to be reduced to use the same frequency band (system band) among all cells.

In the cellular system, typically, the reception power of a signal transmitted from a base station is attenuated for a terminal distant from a base station located at the center of the cell. That is, the reception power of the signal transmitted from the base station is increased for a terminal located near the center of the cell, whereas the reception power of the signal is decreased for a terminal located near the edge of the cell. On the other hand, the interference from an adjacent cell is decreased for a terminal (a terminal distant from the adjacent cell) located near the center of the cell, whereas the interference is increased for a terminal (a terminal close to the adjacent cell) located near the edge of the cell. That is, the influence of the ICI is decreased for the terminal located near the center of the cell, whereas the influence of the ICI is increased for the terminal located near the edge of the cell.

Accordingly, a coordinated multipoint transmission (CoMP transmission) technique has been studied as a technique of improving the reception characteristics (such as the throughput) of the terminal (the terminal located near the edge of the cell) largely affected by the ICI, (for example, see Patent Literature 1, Non-patent Literature 1, and Non-patent Literature 2). In the coordinated multipoint transmission, a plurality of adjacent base stations use the same frequency and coordinate to transmit signals to the same terminal. In the coordinated multipoint transmission, an inter-base-station cooperation MIMO communication scheme, a site diversity scheme, and the like have been suggested.

There has been suggested a conventional technique of improving the transmission capacity characteristics by using a hybrid scheme of a plural base station cooperation MIMO communication scheme using the CoMP transmission (hereinafter, referred to as CoMP transmission) and a single base station MIMO communication scheme (hereinafter, referred to as a single base station transmission) by a single base station (for example, see Non-Patent Literature 1). In the conventional technique, the single base station transmission is applied to a terminal (for example, a terminal located near the center of the cell) having satisfactory reception characteristics and the CoMP transmission is applied to a terminal (a terminal located near the edge of the cell) being largely affected by ICI and thus having unsatisfactory reception characteristics.

CITATION LIST

Patent Literature

PTL 1
Japanese Patent Application Laid-Open No. 2003-23381

Non-Patent Literature

NPL 1
N. Kusashima, Ian Dexter Garcia, S. Kaneko, T. Inoue, K. Sakaguchi, Kiyomichi Araki, "Fractional Base Station Cooperation Cellular Network," IEICE technical report RCS2008-226, March, 2009

NPL 2
T. Yamamoto, H. Iwai, T. Ueda, S. Obana, "A Study of the Effect of Power, Timing and Frequency Offset Difference on Multi-Site Cooperative MIMO Systems," IEICE technical report RCS2008-225, March, 2009

SUMMARY OF INVENTION

Technical Problem

In the conventional technique, however, as to a terminal of the transmission destination of the transmission data, a base station needs to distinguish a terminal to which the single base station transmission is to be applied, or a terminal to which the CoMP transmission is to be applied. When the base station distinguishes a terminal, the base station can use a distinguishing method of using the distance between a terminal and the center of a cell, or a distinguishing method of using the reception quality of a terminal. For example, in the distinguishing method of using the distance between the terminal and the center of the cell, position information on the terminal is used. The single base station transmission is applied to a terminal close to the center of the cell, and the plural base station communication is applied to a terminal distant from the center of the cell. On the other hand, in the distinguishing method of using the reception quality of the terminal, for example, a signal to interference plus noise ratio (SINR) is used. The base station determines whether to apply the single base station transmission or the CoMP transmission based on the SINR of the terminal.

Here, it is difficult to execute the distinguish method of using the distance between the terminal and the center of the cell. In general, the area of a cell that each of the plurality of base stations covers is highly likely to be distorted due to the influence of geography or the like. For this reason, the base station may not accurately measure the distance between the terminal and the center of the cell. Further, the base station may scarcely manage the communication scheme or the used frequency band of each terminal in accordance with the distance between the terminal and the center of the cell. In effect, it is not necessarily easy to switch the transmission scheme so as to obtain the advantageous reception characteristics of each terminal even based on only the distance between the terminal and the center of the cell, since the magnitude of the reception power is different depending on the environment (a reflecting object, a scattering object, or the like) of a propagation path.

On the other hand, in the distinguish method of using the reception quality (hereinafter, the SINR will be used as an example in the following description), a terminal needs to supply a base station with feedback information regarding the measured SINR. Here, when each terminal measures the SINR in a sub-carrier unit or a resource block (RB) unit in an orthogonal frequency division multiple access (OFDMA) scheme, all of the terminals belonging to the cell that the base station covers supply the base station with feedback information regarding the SINR for each frequency block (sub-carrier or RB) of several tens to several thousands of orders. For this reason, the respective terminals supply the base station with the massive amount of feedback information.

On the other hand, when the terminal measures the SINR in the entire system band, the terminal may supply the base station with one piece of SINR feedback information (for example, the average SINR of the entire system band) in the entire system band. Accordingly, the amount of feedback information supplied from each terminal to the base station can be reduced. In the system band, however, there coexist signals (signals addressed to the terminals located near the center of the cell) by the single base station transmission and signals (signals addressed to the terminals located near the edge of the cell) by the CoMP transmission. Therefore, when the terminals measure the SINR of the entire system band and supply the measured SINR as SINR feedback information, the SINR information is supplied as feedback information which indicates the SINR of the frequency bands in which there coexist the signals (the signals addressed to the terminals located near the center of the cell and the signals addressed to the terminals located near the edge of the cell) of two different kinds of the transmission schemes. For this reason, the SINR may not be accurately measured and it is difficult to determine which transmission scheme is applied. Further, "a terminal located near the edge of a cell" refers to a terminal under a communication environment where the influence of the ICI is large, and "a terminal located near the center of a cell" refers to a terminal under a communication environment where the influence of the ICI is small. As described above, the magnitude of influence of the ICI depends on a communication environment including various factors such us the distance between a terminal and the center of a cell. Thus, the expressions "a terminal located near the edge of a cell" and "a terminal located near the center of a cell" mean a difference in a communication environment of each terminal.

The object of the present invention is to provide a base station, a terminal, and a radio communication method capable of improving the reception characteristics of a terminal located near the edge of a cell by reducing the amount of feedback information supplied from the terminal to the base station and reducing ICI even when single bases station transmission and CoMP transmission are simultaneously executed.

Solution to Problem

A base station according to the invention communicates with each of one or more terminals using one of a first transmission scheme, in which a signal is transmitted only by the radio base station apparatus, and a second transmission scheme, in which the signal is transmitted by the radio base station apparatus in coordination with another base station. The base station includes: a setting section that sets partial frequency bands of a system band used to communicate with the terminal as first frequency bands used for the first transmission scheme and sets partial frequency bands of the system band as second frequency bands used for the second transmission scheme, and that sets one of the first frequency bands and the second frequency bands as specific frequency bands for measuring a reception quality; a receiving section that receives quality information indicating the reception quality of the specific frequency bands from the terminal as to the set specific frequency band; and a determining section that determines one of the first transmission scheme and the second transmission scheme as a transmission scheme used to communicate with the terminal based on the reception quality indicated by the received quality information.

A terminal according to the invention communicates with a base station communicating using one transmission scheme of a first transmission scheme, in which a signal is transmitted only by the radio base station apparatus, and a second transmission scheme, in which the signal is transmitted by the radio base station apparatus in coordination with another base station. The terminal includes: a receiving section that receives, from the base station, information indicating specific frequency bands which are one of first frequency bands used in the communication by the first transmission scheme and second frequency bands used in the communication by the second transmission scheme in a system band used for the communication; a transmitting section that feeds back quality information indicating a reception quality of the specific frequency bands to the base station; and a communicating section that communicates with the base station using one of the first transmission scheme and the second transmission scheme determined by the base station based on the quality information.

According to the invention, there is provided a radio communication method in a base station communicating with each of one or more terminals using one of a first transmission scheme, in which a signal is transmitted only by the radio base station apparatus, and a second transmission scheme, in which the signal is transmitted by the radio base station apparatus in coordination with another base station. The radio communication method includes: setting partial frequency bands of a system band used to communicate with the terminal as first frequency bands used for the first transmission scheme, setting partial frequency bands of the system band as second frequency bands used for the second transmission scheme, and setting one of the first frequency bands and the second frequency bands as specific frequency bands for measuring a reception quality; receiving quality information indicating the reception quality of the specific frequency bands from the terminal as to the set specific frequency band; and determining one of the first transmission scheme and the second transmission scheme as a transmission scheme used to communicate with the terminal based on the reception quality indicated by the received quality information.

Advantageous Effects of Invention

According to the base station, the terminal, and the radio communication method of the invention, the base station allocates some of all the frequency bands to bands used for single base station transmission (the first transmission scheme) and allocates some of all the frequency bands to bands used for plural base station transmission (the second transmission scheme). Then, the base station receives the feedback information indicating the reception quality of some of all the frequency bands used for the first or second transmission scheme, and determines which the transmission scheme is used based on the feedback information. Accordingly, since the feedback information can be restricted to the information indicating the reception quality of some of all the frequency bands, the amount of feedback information can be reduced. Further, since the feedback information indicates the reception quality of one of the bands for the first transmission scheme and the bands for the second transmission scheme, the information indicating both transmission schemes may not coexist unlike the conventional technique and the transmission scheme can be accurately determined.

Thus, even when the single base station transmission and the CoMP transmission are simultaneously executed, the reception characteristics of the terminal located near the edge of the cell can be improved by reducing the amount of feedback information given from the terminal to the base station and reducing the ICI.

DESCRIPTION OF EMBODIMENTS

Figure 1:
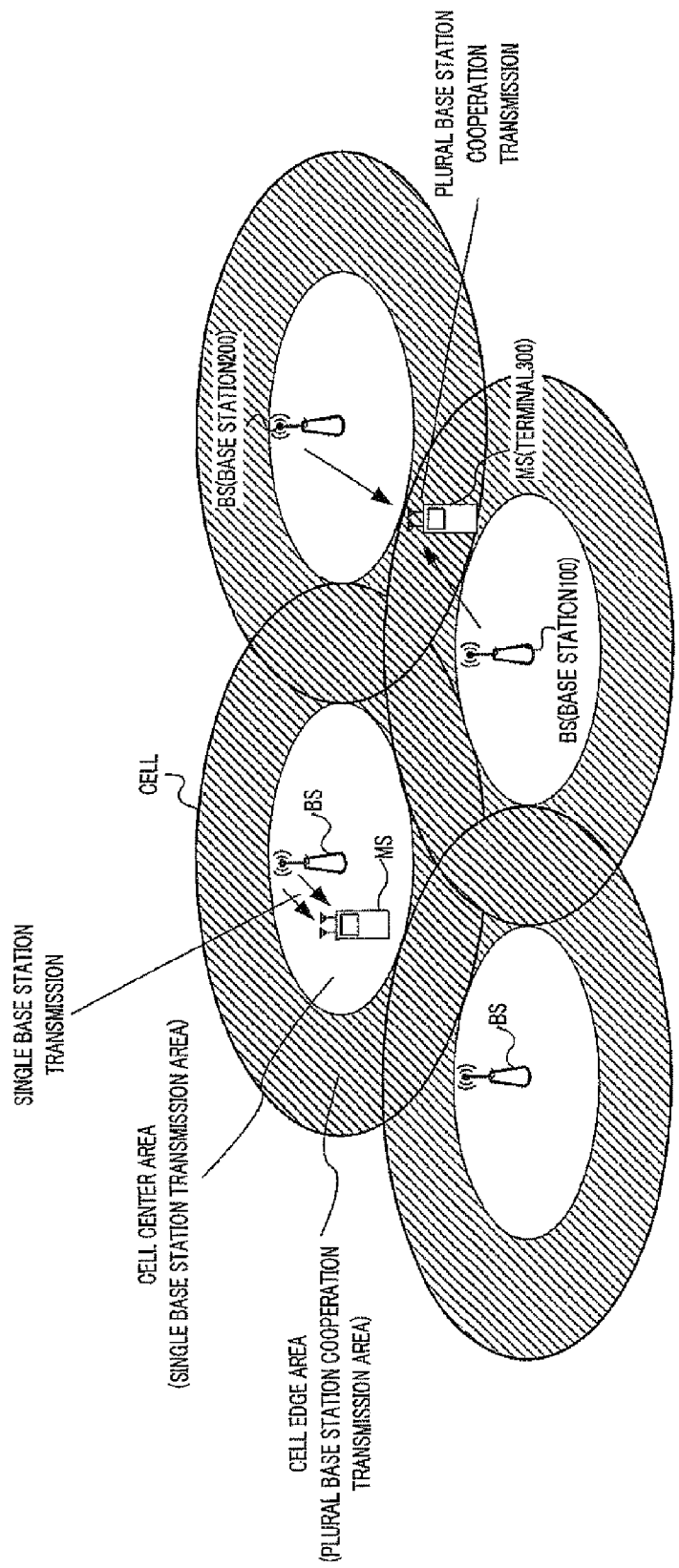
FIG. 1 is a diagram illustrating a radio communication system according to the invention.

According to a first aspect of the invention, a base station, as described above, communicates with each of one or more terminals using one of a first transmission scheme, in which a signal is transmitted only by the own base station, and a second transmission scheme, in which the signal is transmitted by the own base station in coordination with another base station. The base station includes: setting section that sets partial frequency bands of a system band used to communicate with the terminal as first frequency bands used for the first transmission scheme and sets partial frequency bands of the system band as second frequency bands used for the second transmission scheme, and that sets one of the first frequency bands and the second frequency bands as specific frequency bands for measuring a reception quality; a receiving section that receives quality information indicating the reception quality of the specific frequency bands from the terminal, as to the set specific frequency band; and a determining section that determines one of the first transmission scheme and the second transmission scheme as a transmission scheme used to communicate with the terminal based on the reception quality indicated by the received quality information.

In the base station according to a second aspect of the invention, the receiving section receives one piece of quality information indicating the reception quality of all the specific frequency bands from the terminal. The determining section determines the transmission scheme using the one piece of quality information received from the terminal.

With such a configuration, the information fed back from the terminal is one piece of quality information indicating the reception quality of all the specific frequency bands, the amount of feedback information can be further reduced.

In the base station according to a third aspect of the invention, the setting section changes a ratio between a bandwidth of the first frequency bands and a bandwidth of the second frequency bands in the system band depending on a communication state with one or more terminals.

With such a configuration, the base station can flexibly change the frequency bandwidth used for the single base station transmission and the frequency bandwidth used for the CoMP transmission depending on a communication state with the terminal.

In the base station according to a fourth aspect of the invention, the setting section changes the ratio between the bandwidth of the first frequency bands and the bandwidth of the second frequency bands based on at least one of the number of terminals to be communicated with using the first transmission scheme and the number of terminals to be communicated with using the second transmission scheme.

With such a configuration, the base station can flexibly allocate the frequency bands of a signal transmitted by the single base station transmission and a signal transmitted by the CoMP transmission in accordance with the number of terminals to be communicated with using each transmission scheme.

According to a fifth aspect of the invention, a base station communicates with each of one or more terminals using one of a first transmission scheme, in which a signal is transmitted only by the own base station, and a second transmission scheme, in which the signal is transmitted by the own base station in coordination with another base station. The base station includes: a setting section that sets partial frequency bands of a system band used to communicate with the terminal as first frequency bands used for the first transmission scheme and sets partial frequency bands of the system band as second frequency bands used for the second transmission scheme; a receiving section that receives first quality information indicating a reception quality of all the first frequency bands and second quality information indicating a reception quality of all the second frequency bands from the terminal, as to the set first frequency bands and the set second frequency bands; and a determining section that determines one of the first transmission scheme and the second transmission scheme as a transmission scheme used to communicate with the terminal based on the reception quality indicated by the received first quality information and the reception quality indicated by the received second quality information.

With such a configuration, the base station allocates some of all the frequency bands to the bands used for the single base station transmission (the first transmission scheme) and allocates some of all the frequency bands to the bands used for the plural base station transmission (the second transmission scheme). Then, the base station receives the feedback information indicating the total reception quality of each band and determines which the transmission scheme is used based on the feedback information. By setting the feedback information as information indicating both the first and second frequency bands, the amount of feedback information can be reduced compared to a case where feedback quality information regarding each sub-carrier is received. Further, since the feedback information indicates the reception quality of each of the bands for the first transmission scheme and the bands for the second transmission scheme, the information indicating both transmission schemes may not coexist unlike the conventional technique and thus the transmission scheme can be accurately determined.

According to a sixth aspect of the invention, a terminal communicates with a base station communicating using one transmission scheme of a first transmission scheme, in which a signal is transmitted only by the own base station, and a second transmission scheme, in which the signal is transmitted by the own base station in coordination with another base station. The terminal includes: a receiving section that receives, from the base station, information indicating specific frequency bands which are one of first frequency bands used in the communication by the first transmission scheme and second frequency bands used in the communication by the second transmission scheme in a system band used for the communication; a transmitting section that feeds back quality information indicating a reception quality of the specific frequency bands to the base station; and a communicating section that communicates with the base station using one of the first transmission scheme and the second transmission scheme determined by the base station based on the feedback quality information.

With such a configuration, the terminal allocates some of all the frequency bands to the bands used for the single base station transmission (the first transmission scheme) and allocates some of all the frequency bands to the bands used for the plural base station transmission (the second transmission scheme). Then, the terminal feeds back information indicating the reception quality of some of all the frequency bands used for the first or second transmission scheme. Accordingly, since the feedback information can be restricted to the information indicating the reception quality of some of all the frequency bands, the amount of feedback information can be reduced. Further, since the feedback information indicates the reception quality of one of the bands for the first transmission scheme and the bands for the second transmission scheme, the information indicating both transmission schemes may not coexist unlike the conventional technique and thus the base station can accurately determine the transmission scheme to be used.

According to a seventh aspect of the invention, a terminal communicates with a base station communicating using one transmission scheme of a first transmission scheme, in which a signal is transmitted only by the own base station, and a second transmission scheme, in which the signal is transmitted by the own base station in coordination with another base station. The terminal includes: transmitting section that feeds back, to the base station, first quality information indicating a reception quality of all first frequency bands used in the communication by the first transmission scheme in a system band used to communicate with the base station and second quality information indicating a reception quality of all second frequency bands used in the communication by the second transmission scheme in the system band; and a communicating section that communicates with the base station using one of the first transmission scheme and the second transmission scheme determined by the base station based on the feedback quality information.

With such a configuration, the terminal allocates some of all the frequency bands to the bands used for the single base station transmission (the first transmission scheme) and allocates some of all the frequency bands to the bands used for the plural base station transmission (the second transmission scheme). Then, the terminal feeds back the information indicating the entire reception quality of each band. By setting the feedback information as information indicating both the first and second frequency bands, the amount of feedback information can be reduced compared to a case where feedback quality information regarding each sub-carrier is received. Further, since the feedback information indicates the reception quality of each of the bands for the first transmission scheme and the bands for the second transmission scheme, the information indicating both transmission schemes may not coexist unlike the conventional technique, and the base station can accurately determine the transmission scheme to be used.

According to an eighth aspect of the invention, as described above, there is provided a radio communication method in a base station communicating with each of one or more terminals using one of a first transmission scheme, in which a signal is transmitted only by the own base station, and a second transmission scheme, in which the signal is transmitted by the own base station in coordination with another base station. The radio communication method includes: setting partial frequency bands of a system band used to communicate with the terminal as first frequency bands used for the first transmission scheme, setting partial frequency bands of the system band as second frequency bands used for the second transmission scheme, and setting one of the first and second frequency bands as specific frequency bands for measuring a reception quality; receiving quality information indicating the reception quality of the specific frequency bands from the terminal as to the set specific frequency band; and determining one of the first transmission scheme and the second transmission scheme as a transmission scheme used to communicate with the terminal based on the reception quality indicated by the received quality information.

According to a ninth aspect of the invention, there is provided a radio communication method in a terminal communicating with a base station communicating using one transmission scheme of a first transmission scheme, in which a signal is transmitted only by the own base station, and a second transmission scheme, in which the signal is transmitted by the own base station in coordination with another base station. The radio communication method includes: receiving, from the base station, information regarding specific frequency bands which are one of first frequency bands used in the communication by the first transmission scheme and second frequency bands used in the communication by the second transmission scheme in a system band used for the communication; feeding back quality information indicating a reception quality of the specific frequency bands to the base station; and communicating with the base station using one of the first transmission scheme and the second transmission scheme determined by the base station based on the feedback quality information.

Referring to the drawings, the following description will discuss embodiments of the present invention in detail.

FIG. 1 is a diagram illustrating a configuration of a radio communication system according to the invention. In the radio communication system illustrated in FIG. 1, a plurality of base stations (BS) are disposed. The area of a cell which each base station covers includes a cell edge area and a cell center area. For example, an area where the reception quality (SINR) of a terminal is equal to or greater than a preset threshold value is referred to as the cell center area. An area where the reception quality (SINR) of a terminal is less than the preset threshold value is referred to as the cell edge area. In other words, as illustrated in FIG. 1, an area (the cell center area) where the reception quality (SINR) of a terminal is equal to or greater than the threshold value is referred to as an area (a single base station transmission area) where single base station transmission is applied to the terminal. An area (the cell edge area) where the reception quality (SINR) of a terminal is less than the threshold value is referred to as an area (a CoMP transmission area) where CoMP transmission is applied to the terminal.

In the invention, a system band includes a frequency band used for the CoMP transmission and a frequency band used for the single base station transmission. A signal transmitted by the CoMP transmission and a signal transmitted by the single base station transmission are subjected to frequency division and are transmitted. That is, the base station according to the invention simultaneously executes the single base station transmission by which only the own base station transmits the signal and the CoMP transmission by which the own base station and other base stations cooperate to transmit the signal at different frequency bands in the system band.

Embodiment 1

Figure 2:
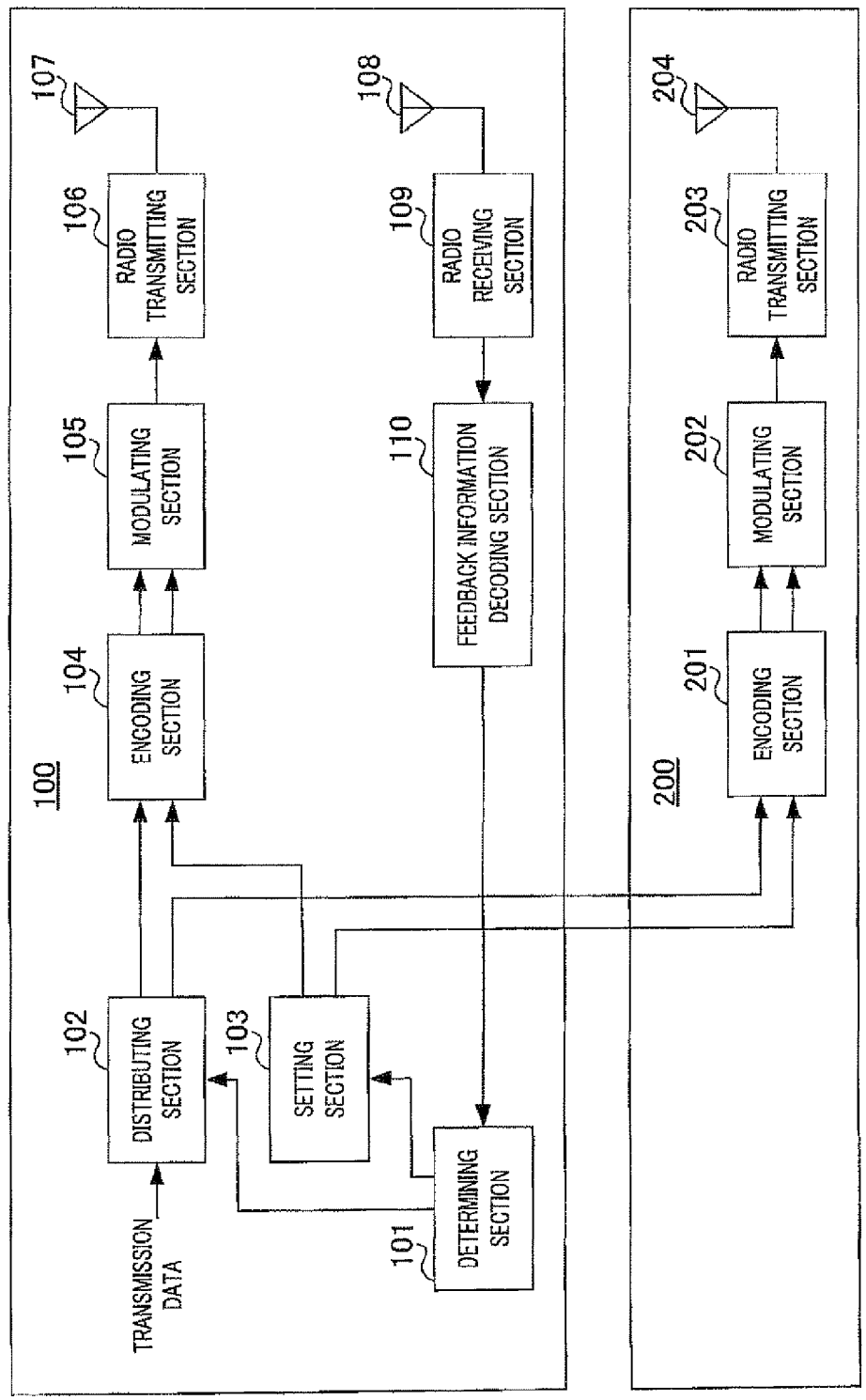
FIG. 2 is a block diagram illustrating the configurations of base stations (a master base station and a slave base station) according to Embodiment 1 of the invention.
Figure 3:
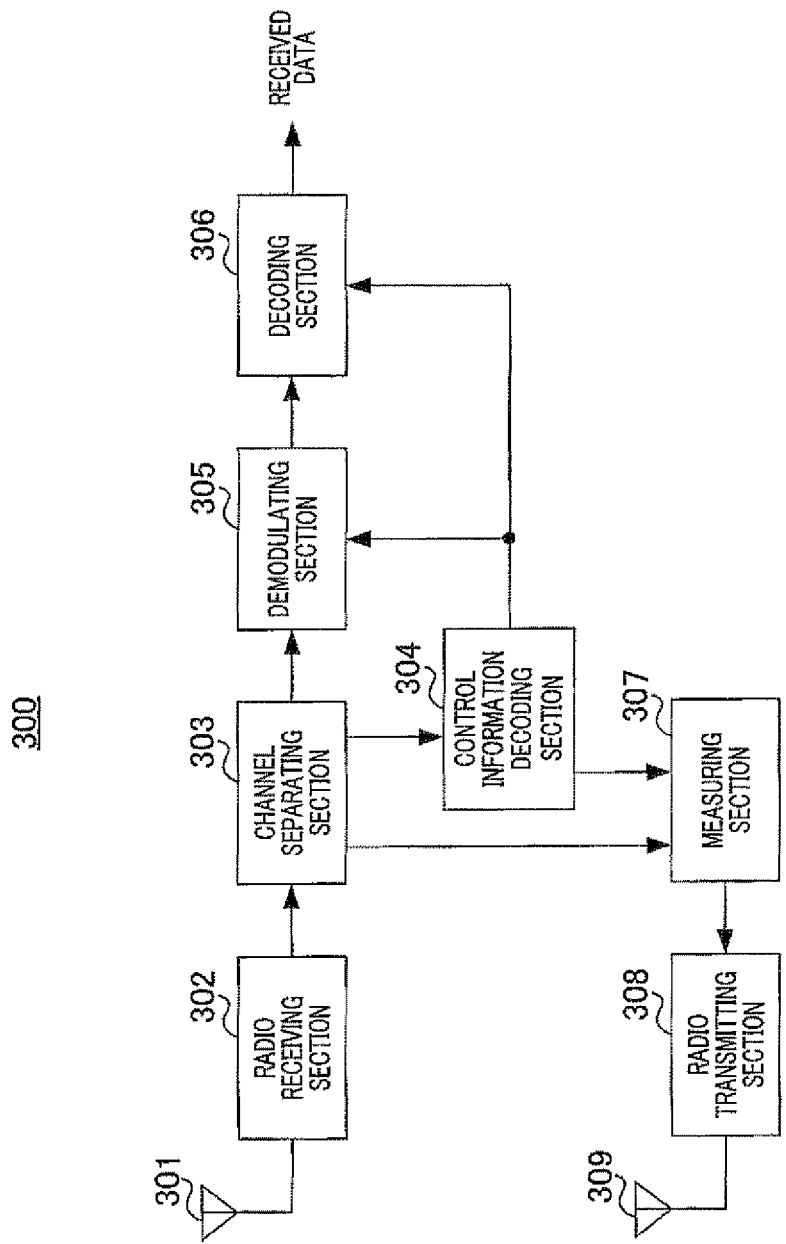
FIG. 3 is a block diagram illustrating the configuration of a terminal according to Embodiment 1 of the invention.

FIG. 2 illustrates the configurations of base stations 100 and 200 of the radio communication system (see FIG. 1) according to this embodiment. FIG. 3 illustrates the configuration of terminal 300. Here, a base station (base station 100 in FIG. 1) covering an area where a terminal (terminal 300 in FIG. 1) is present is referred to as a master base station (or also referred to as a serving cell). Another base station (base station 200 in FIG. 1) executing the CoMP transmission along with the master base station is referred to as a slave base station (or also referred to as a neighbor cell). Base station 100 serving as the master base station notifies base station 200 serving as the slave base station of control information regarding a frequency band allocable for transmission data.

In base station 100 (the master base station) illustrated in FIG. 2, determining section 101 determines one of the single base station transmission and the CoMP transmission as a transmission scheme for terminal 300, based on the SINR (the reception quality) of terminal 300 included in feedback information input from feedback information decoding section 110. When determining section 101 determines the CoMP transmission for terminal 300, determining section 101 determines a plurality of base stations (the own base station and base station 200 in FIG. 1) executing the CoMP transmission. On the other hand, when determining section 101 determines the single base station transmission for terminal 300, determining section 101 determines the own base station as the base station executing the single base station transmission. Then, determining section 101 outputs information regarding the determined base station (the base station executing the single base station transmission or the plurality of base stations executing the CoMP transmission) to distributing section 102 and setting section 103.

Distributing section 102 distributes the input transmission data to each base station, when a plurality of base stations (base stations transmitting the transmission data to terminal 300) is illustrated in the information input from determining section 101 (that is, the CoMP transmission is executed). Then, distributing section 102 outputs the distributed transmission data to encoding sections (encoding section 104 of the own base station and encoding section 201 of base station 200 in FIG. 2) of the corresponding base stations. On the other hand, distributing section 102 outputs the input transmission data to encoding section 104 as is, when a single base station is illustrated in the information input from determining section 101 (that is, the single base station transmission is executed).

Setting section 103 sets a frequency band (a resource block (RB)) used for the single base station transmission and a frequency band (a resource block (RB)) used for the CoMP transmission in the system band. Then, based on the information input from determining section 101, setting section 103 sets a frequency band allocated for the transmission data in the frequency band (the frequency band used for the single base station transmission or the frequency band used for the CoMP transmission) used in a terminal at the transmission destination of the transmission data. Setting section 103 generates control information including information, which indicates the frequency position of the frequency band used for the single base station transmission and the frequency positions of the frequency bands used for the CoMP transmission, and including band allocation information, which indicates a frequency band allocated for the transmission data addressed to the terminal. When the CoMP transmission is executed, setting section 103 outputs the control information to the encoding sections (encoding section 104 and encoding section 201 of base station 200 in FIG. 2) of the plurality of base stations executing the CoMP transmission. Further, when the single base station transmission is executed, setting section 103 outputs the control information including the band allocation information only to encoding section 104.

Setting section 103 sets a specific frequency band (hereinafter, referred to as an SINR measurement frequency band) of which the SINR is measured in the terminal. Here, setting section 103 sets the specific frequency band narrower than the system bandwidth, as the SINR measurement frequency band. Specifically, setting section 103 sets, as the SINR measurement frequency band, one of the frequency band used for the single base station transmission and the frequency band used for the CoMP transmission in the system band. Then, setting section 103 generates control information including information indicating the set SINR measurement frequency band and outputs the generated control information to encoding section 104.

Encoding section 104 encodes the transmission data input from distributing section 102, and the control information input from setting section 103. At this time, encoding section 104 encodes the transmission data input from distributing section 102 based on the control information input from setting section 103. Then, encoding section 104 outputs the encoded transmission data and the encoded control information to modulating section 105.

Modulating section 105 modulates the transmission data and the control information input from encoding section 104, multiplexes a pilot signal (the known signal between the base station and the terminal), and outputs the modulated signal to radio transmitting section 106. At this time, modulating section 105 executes transmission data modulation and resource mapping based on the control information input from encoding section 104.

Radio transmitting section 106 executes transmitting processes, such as D/A conversion, amplification, and up-converting, on the signals (the transmission, data and the control information) input from modulating section 105 and the pilot signal, and then transmits the processed signals via antenna 107. In a case of the MIMO scheme, radio transmitting section 106 transmits the processed signals via a plurality of antennas (not illustrated).

In base station 200 (the slave base station of base station 100 (the master base station)) illustrated in FIG. 2, encoding section 201 is supplied with the transmission data transmitted from distributing section 102 of base station 100 (the master base station) and is supplied with the control information (the information indicating the frequency position of the frequency band used for the single base station transmission and the frequency position of the frequency band used for the CoMP transmission, and the band allocation information) transmitted from setting section 103. That is, base station 100 (the master base station) notifies base station 200 (the slave base station) of the control information regarding the frequency band allocated for the transmission data. In the LTE, for example, base station 100 shares control information (for example, a frequency band ratio) with the plurality of base stations executing the CoMP transmission by using an inter-base-station interface called an X2 interface (X2 I/F). Here, encoding section 201, modulating section 202, radio transmitting section 203, and antenna 204 of base station 200 execute the same processes of encoding section 104, modulating section 105, radio transmitting section 106, and antenna 107 of base station 100, respectively. In this way, base stations 100 and 200 illustrated in FIG. 2 cooperate to transmit the signal (the transmission data) to the same terminal (terminal 300 illustrated in FIG. 3) by using the same frequency (that is, executing the CoMP transmission), as illustrated in FIG. 1.

Radio receiving section 109 of base station 100 (the master base station) receives a signal transmitted from each terminal via antenna 108 and executes receiving processes, such as down-converting and A/D conversion, on the received signal. Here, the signal transmitted from each terminal includes feedback information including SINR information indicating the SINR measured by each terminal. Then, radio receiving section 109 outputs the feedback information in the received signal subjected to the receiving processes to feedback information decoding section 110.

Feedback information decoding section 110 decodes the feedback information input from radio receiving section 109, and outputs the decoded feedback information (SINR information) to determining section 101.

Next, radio receiving section 302 of terminal 300 illustrated in FIG. 3 receives the signal (the signal transmitted by the single base station transmission or the signal transmitted by the CoMP transmission) transmitted from base station 100 or base station 200 illustrated in FIG. 2 via antenna 301, and then executes receiving processes, such as down-converting and A/D conversion, on the received signal. In the case of the MIMO scheme, radio receiving section 302 receives the signal transmitted from base station 100 or base station 200 via a plurality of antennas (not illustrated). Then, radio receiving section 302 outputs the signal subjected to the receiving processes to channel separating section 303. Here, the signal received by terminal 300 includes the data, the control information, and the pilot signal addressed to terminal 300.

Channel separating section 303 separates the signal input from radio receiving section 302 into the data, the control information, and the pilot signal, outputs the data to demodulating section 305, outputs the control information to control information decoding section 304, and outputs the pilot signal to measuring section 307.

Control information decoding section 304 demodulates and decodes the control information input from channel separating section 303. Then, control information decoding section 304 outputs information regarding the data addressed to the own base station in the decoded control information to demodulating section 305 and decoding section 306, and outputs the control information including the information indicating the SINR measurement frequency band to measuring section 307.

Demodulating section 305 demodulates the data addressed to the own base station input from channel separating section 303, based on the control information input from control information decoding section 304, and then outputs the demodulated data to decoding section 306.

Decoding section 306 decodes the data input from channel separating section 303 based on the control information input from control information decoding section 304, and then outputs the decoded data as received data.

Measuring section 307 measures the SINR (for example, the average SINR of all the SINR measurement frequency bands) of the SINR measurement frequency bands input from control information decoding section 304 by using the pilot signal input from channel separating section 303. For example, when the SINR measurement frequency band is a frequency band used for the single base station transmission, measuring section 307 measures the SINR of the frequency band used for the single base station transmission. Further, for example, when the SINR measurement frequency band is a frequency band used for the CoMP transmission, measuring section 307 measures the SINR of the frequency band used for the CoMP transmission. Then, measuring section 307 outputs the SINR information indicating the measured SINR to radio transmitting section 308.

Radio transmitting section 308 executes the transmitting processes, such as D/A conversion, amplification, and up-converting, on the feedback information including the SINR information input from measuring section 307, and then transmits the processed feedback information via antenna 309.

Next, a radio communication process of the radio communication system according to this embodiment will be described in detail.

Figure 4:
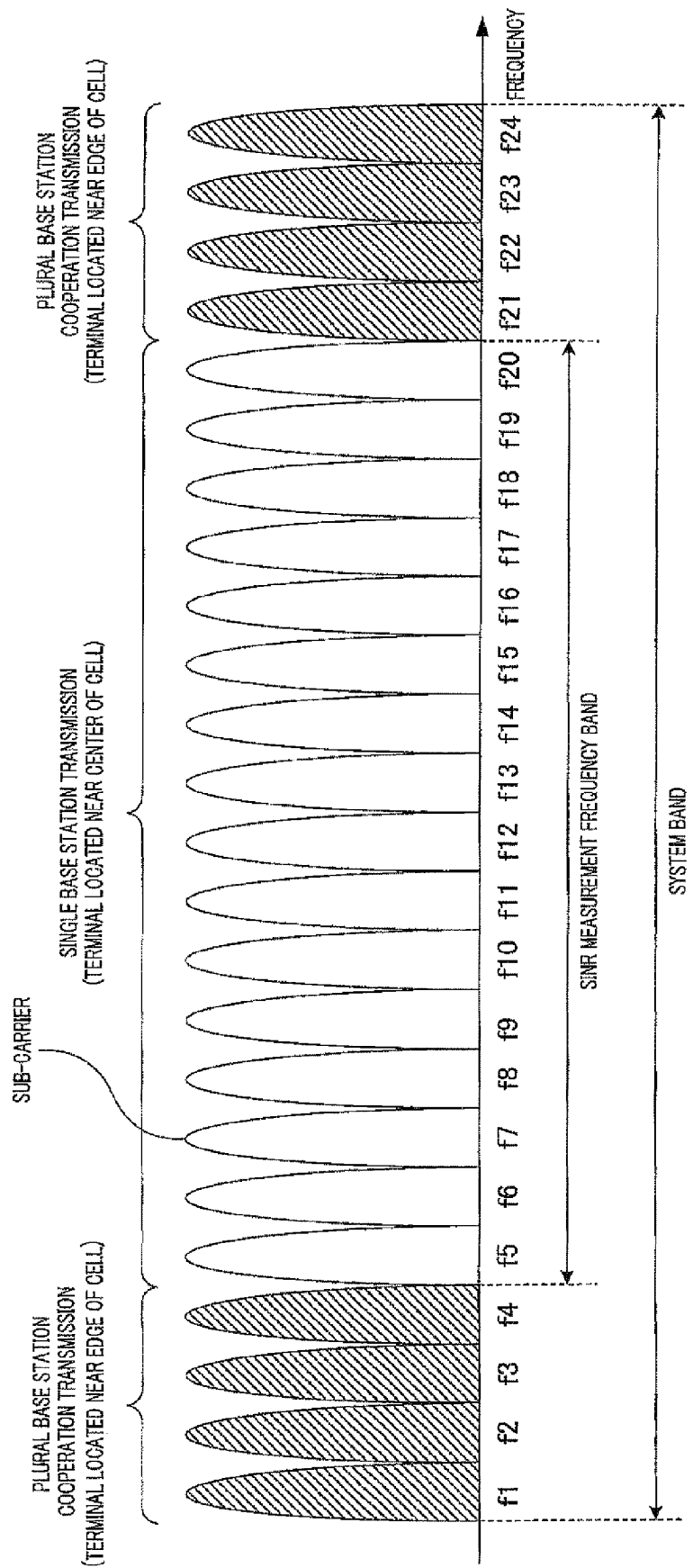
FIG. 4 is a diagram illustrating a system band according to Embodiment 1 of the invention.

In the following description, as illustrated in FIG. 4, the system band of the radio communication system is assumed to be frequency bands that have the bandwidth corresponding to twenty four sub-carriers of f1 to f24. As illustrated in FIG. 4, a total of eight sub-carriers at both ends of the system band (the sub-carriers f1 to f24), that is, four sub-carriers f1 to f4 and four sub-carriers f21 to f24 are assumed to be frequency bands used for the CoMP transmission. Further, sixteen sub-carriers f5 to f20 (that is, the frequency bands other than the frequency bands used for the CoMP transmission) in the middle of the system band (the sub-carriers f1 to f24) are assumed to be frequency bands used for the single base station transmission. That is setting section 103 of base station 100 sets the frequency bands used for the single base station transmission in the center frequencies of the system band, and sets the frequency bands used for the CoMP transmission at both ends (that is, both ends of the frequency bands used for the single base station transmission) of the system band. In this way, the signal transmitted by the CoMP transmission and the signal transmitted by the single base station transmission are frequency-divided to the sub-carriers f1 to f4 and f21 to f24 illustrated in FIG. 4, and the sub-carriers f5 to f20 to be transmitted.

Here, setting section 103 (see FIG. 2) of base station 100 (the master base station) sets the frequency bands (the sub-carriers f5 to f20) used for the single base station transmission in the system band illustrated in FIG. 4 as the frequency bands of which the SINR is measured in the terminal, that is the SINR measurement frequency bands. Then, setting section 103 generates control information indicating the frequency bands (the sub-carriers f5 to f20). Base station 100 (the master base station) notifies terminal 300 of the control information including information regarding the SINR measurement frequency bands (the sub-carriers f5 to f20 illustrated in FIG. 4).

Further, base station 100 (the master base station) notifies base station 200 (the slave base station) of control information indicating the frequency positions (the sub-carriers f1 to f4 and f21 to f24 illustrated in FIG. 4) of the frequency bands used for the CoMP transmission and the frequency positions (the sub-carriers f5 to f20 illustrated in FIG. 4) of the frequency bands used for the single base station transmission. Furthermore, base station 100 (the master base station) notifies base station 200 (the slave base station) of control information including band information indicating the bands allocated for the signals transmitted by the CoMP transmission.

On the other hand, when measuring section 307 of terminal 300 receives the control information including the information regarding the SINR measurement frequency bands, measuring section 307 measures the SINR (for example, the average SINR of the sub-carriers f5 to f20) of the sub-carriers f5 to f20 corresponding to the SINR measurement frequency bands. That is, measuring section 307 measures the SINR using only the frequency bands (the sub-carriers f5 to f20) used for the single base station transmission. In this way, terminal 300 can accurately measure the SINR of the signal transmitted by the single base station transmission. As the SINR measurement result, terminal 300 can obtain only the SINR (that is, one SINR) of one frequency block including the sub-carriers f5 to f20 illustrated in FIG. 4. Then, terminal 300 gives feedback information including SINR information regarding the measured SINR to base station 100. In this way, only one piece of feedback information regarding the reception quality of the SINR measurement frequency band can be fed back. Accordingly, the very small amount of feedback information is fed back from terminal 300 to base station 100.

Determining section 101 of base station 100 determines, as the transmission scheme for terminal 300, one of the single base station transmission and the CoMP transmission based on the SINR fed back from terminal 300, that is, the SINR of the sub-carriers f5 to f20 illustrated in FIG. 4. For example, when the SINR of terminal 300 is equal to or greater than the preset threshold value (when the SINR is high), it can be known that a sufficient reception quality can be obtained even in the single base station transmission. Therefore, determining section 101 determines the single base station transmission for terminal 300. On the other hand, when the SINR of terminal 300 is less than the preset threshold value (when the SINR is low), it can be known that an insufficient reception quality is obtained for the single base station transmission. Therefore, determining section 101 determines the CoMP transmission for terminal 300. That is, based on the SINR of terminal 300, determining section 101 determines whether the single base station transmission can be executed for terminal 300. In other words, based on the SINR of terminal 300, determining section 101 determines whether the single base station transmission can be executed due to the fact that terminal 300 is located near the center of the cell (the cell center area illustrated in FIG. 1) where the SINR is high, or the CoMP transmission needs to be executed due to the fact that terminal 300 is located near the edge of the cell (the cell edge area illustrated in FIG. 1) where the SINR is low.

Here, determining section 101 of base station 100 uses the SINR measured only for the signal of the frequency bands used for the single base station transmission in terminal 300. Therefore, determining section 101 of base station 100 can accurately determine whether terminal 300 can obtain a satisfactory reception quality even for the single base station transmission. That is, determining section 101 of base station 100 can accurately distinguish whether terminal 300 is a terminal to which the single base station transmission is applied, or a terminal to which the CoMP transmission is applied.

When determining section 101 determines the single base station transmission (when the SINR is equal to or greater than the threshold value), base station 100 transmits the transmission data using one of the frequency bands (the sub-carriers f5 to f20) used for the single base station transmission illustrated in FIG. 4.

On the other hand, when determining section 101 determines the CoMP transmission (when the SINR is less than the threshold value), base station 100 distributes the transmission data to the own base station as well as base station 200 (the slave base station), and notifies base station 200 of the control information including the band allocation information indicating the frequency bands allocated for the transmission data. Then, base stations 100 and 200 cooperate to transmit the transmission data by using the same frequencies of the frequency bands (the sub-carriers f1 to f4 and f21 to f24) used for the CoMP transmission.

Likewise, base station 100 sets, as the SINR measurement frequency bands, the frequency band (that is, specific frequency bands in the system band) used for the single base station transmission in the system band. In this way, since terminal 300 measures the SINR only for the SINR measurement frequency bands (the frequency bands used for the single base station transmission), terminal 300 can accurately measure the SINR of the frequency bands used for the single base station transmission.

Thus, based on the accurate SINR, base station 100 can accurately distinguish whether the single base station transmission or the CoMP transmission is applied to terminal 300. That is, based on the SINR of terminal 300, base station 100 can accurately determine whether or not terminal 300 is a terminal located near the edge of the cell where the influence of the ICI is large, that is, a terminal to which the CoMP transmission is applied. Accordingly, when terminal 300 is the terminal located near the edge of the cell (the terminal where the influence of the ICI is large), base station 100 (the master base station) reduces the ICI of terminal 300 by executing the CoMP transmission for terminal 300 as well as base station 200 (the slave base station), thereby improving the reception characteristics of terminal 300 (the terminal located near the edge of the cell).

Further, the terminal can suppress the amount of feedback information to be small, since the terminal feeds back one piece of SINR information (in the above-described example, the average SINR) in all the frequency bands used for the single base station transmission.

In this embodiment, even when the single base station transmission and the CoMP transmission are simultaneously executed, since the amount of information fed back from the terminal to the base station, and the ICI are reduced, the reception characteristics of the terminal located near the edge of the cell can be improved.

In this embodiment, the case has already been described in which base station 100 (the master base station) notifies base station 200 (the slave base station) of the control information indicating the frequency positions of the frequency bands used for each transmission scheme. However, the method of sharing the information regarding the frequency positions between the master base station and the slave base station is not limited thereto. Hereinafter, it will be explained using the frequency bands used for the single base station transmission as an example. For example, when the bandwidth of the frequency bands used for the single base station transmission is fixed to sixteen sub-carriers in the entire system, the slave base station can know that the frequency bands corresponding to sixteen sub-carriers from the start point of the frequency positions are the frequency bands used for the single base station transmission, only when the slave base station is notified of information regarding the start point (in the above-described example, f5) of the frequency positions. The same is applied to a case where the slave base station is notified of the frequency bands used for the CoMP transmission. Further, when the frequency position is fixed in addition to the start point of the frequency position, it is, of course, not necessary to share the information indicating the frequency bands used for each transmission scheme from the master base station to the slave base station.

Embodiment 2

In this embodiment, a ratio (hereinafter, referred to as a frequency band ratio) between the bandwidth of the frequency bands used for the single base station transmission and the bandwidth of the frequency bands used for the CoMP transmission in the system band is set to be variable. The frequency band ratio is fixed in Embodiment 1. However, in this embodiment, the frequency band ratio is variable to construct the system capable of executing flexible control in accordance with the communication state with the terminal.

In this embodiment, setting section 103 (see FIG. 2) of base station 100 receives the number of terminals (hereinafter, referred to as the number of cell edge terminals) located in the cell edge area of base station 100 illustrated in FIG. 1, and the number of terminals (hereinafter, referred to as the number of cell center terminals) located in the cell center area of base station 100 illustrated in FIG. 1 (or receives a ratio of the number of cell edge terminals to the number of cell center terminals), as input. Setting section 103 sets the frequency band ratio to be variable in accordance with the number of cell edge terminals and the number of cell center terminals (or a ratio between the number of cell edge terminals and the number of cell center terminals). Setting section 103 sets the frequency positions of the frequency bands used for the single base station transmission and the frequency positions of the frequency bands used for the CoMP transmission in accordance with the frequency band ratio. Setting section 103 notifies base station 200 (the slave base station) and terminal 300 of the control information including information regarding the set frequency band ratio and the frequency positions.

On the other hand, measuring section 307 (see FIG. 3) of terminal 300 according to this embodiment specifies the frequency bands used for the single base station transmission and the frequency bands used for the CoMP transmission, based on the frequency band ratio and the frequency positions both included in the received control information. Measuring section 307 sets the frequency bands used for specified single base station transmission, as the SINR measurement frequency band. Measuring section 307 measures the SINR (for example, the average SINR) of the SINR measurement frequency bands.

Next, the radio communication process of the radio communication system according to this embodiment will be described in detail.

Figure 5:
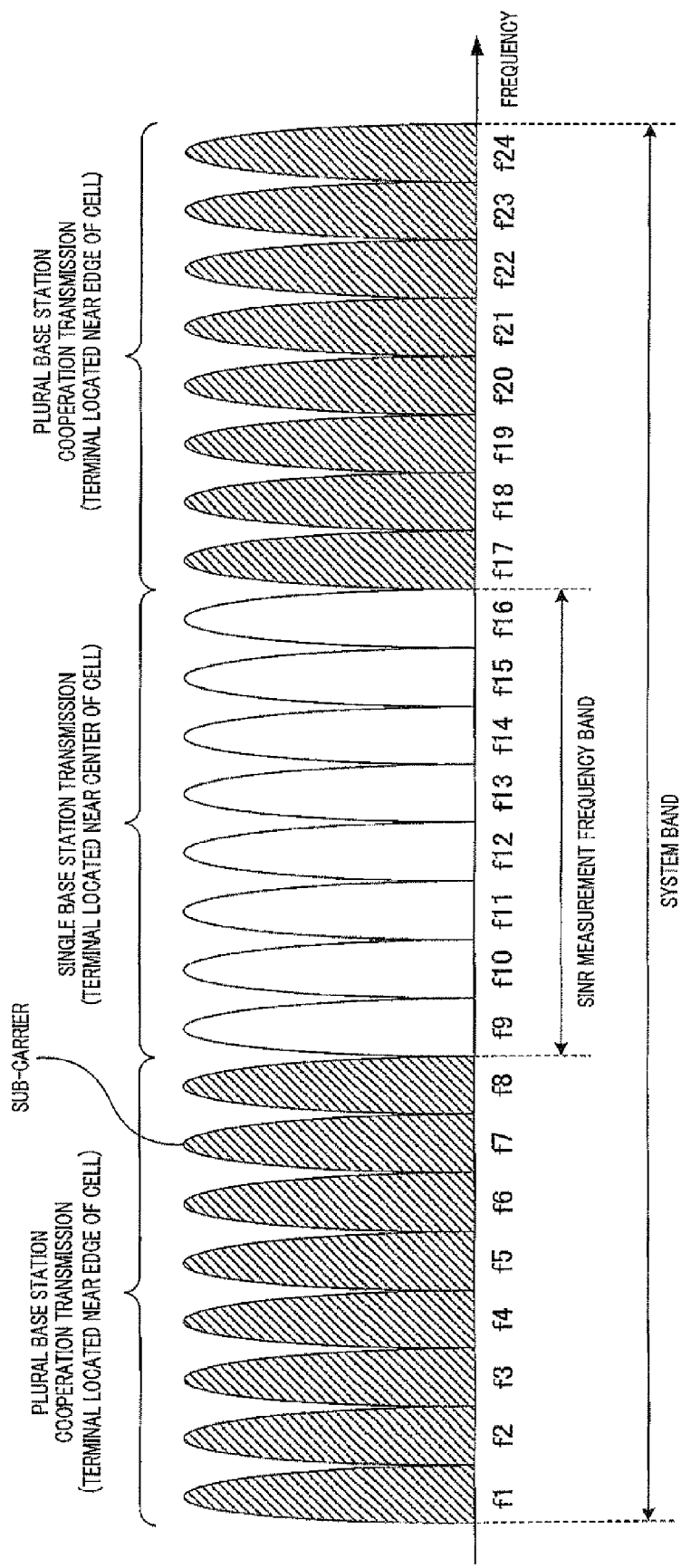
FIG. 5 is a diagram illustrating a system band according to Embodiment 2 of the invention.

In the following description, as in Embodiment 1, the system band of the radio communication system is assumed to be the frequency bands which have the bandwidth corresponding to twenty four sub-carriers f1 to f24, as illustrated in FIGS. 4 and 5. Here, as in Embodiment 1, the frequency bands used for the single base station transmission illustrated in FIGS. 4 and 5 are set as the SINR measurement frequency bands.

In FIG. 4, as in Embodiment 1, a total of eight sub-carriers at both ends of the system band (the sub-carriers f1 to f24), that is, four sub-carriers f1 to f4 and four sub-carriers f21 to f24 are assumed to be frequency bands used for the CoMP transmission. Further, sixteen sub-carriers f5 to f20 in the middle of the system band (the sub-carriers f1 to f24) are assumed to be frequency bands used for the single base station transmission. That is, a ratio between the bandwidth of the frequency bands used for the single base station transmission and the bandwidth of the frequency bands used for the CoMP transmission is 2:1 (=16:8).

On the other hand, in FIG. 5, a total of sixteen sub-carriers at both ends of the system band (the sub-carriers f1 to f24), that is, eight sub-carriers f1 to f8 and eight sub-carriers f17 to f24 are assumed to be frequency bands used for the CoMP transmission. Further, eight sub-carriers f9 to f16 in the middle of the system band (the sub-carriers f1 to f24) are assumed to be frequency bands used for the single base station transmission. That is, a ratio between the bandwidth of the frequency bands used for the single base station transmission and the bandwidth of the frequency bands used for the CoMP transmission is 1:2 (=8:16).

That is, when comparing FIG. 4 with FIG. 5, the frequency bands used for the CoMP transmission are eight sub-carriers, whereas the frequency bands used for the single base station transmission are sixteen sub-carriers in FIG. 4. In FIG. 5, however, the frequency bands used for the CoMP transmission are sixteen sub-carriers, whereas the frequency bands used for the single base station transmission are eight sub-carriers. That is, in FIG. 4, the frequency bands used for the CoMP transmission are narrower than the frequency bands used for the single base station transmission. However, in FIG. 5, the frequency bands used for the CoMP transmission are broader than the frequency bands used for the single base station transmission. In other words, the ratio of the frequency bands used for the CoMP transmission to the entire system band is greater in FIG. 5 than in FIG. 4.

Accordingly, setting section 103 of base station 100 compares a preset threshold value with the ratio between the number of cell center terminals and the number of cell edge terminals. As a result, when the ratio between the number of cell edge terminals and the number of all terminals within the cell which the own base station covers is relatively small (that is, when the ratio between the number of cell center terminals and the number of all terminals is relatively large), setting section 103 sets the frequency bands used for the single base station transmission and the frequency bands used for the CoMP transmission by using the frequency band ratio illustrated in FIG. 4. That is, setting section 103 allows the ratio of the bandwidth of the frequency bands used for the single base station transmission to be greater than the ratio of the bandwidth of the frequency bands used for the CoMP transmission. On the other hand, for example, when the ratio between the number of cell edge terminals and the number of all terminals within the cell which the own base station covers is relatively large (that is, when the ratio between the number of cell center terminals and the number of all terminals is relatively small), setting section 103 of base station 100 sets the frequency bands used for the single base station transmission and the frequency bands used for the CoMP transmission by using the frequency band ratio illustrated in FIG. 5. That is, setting section 103 allows the ratio of the bandwidth of the frequency bands used for the CoMP transmission to be greater than the ratio of the bandwidth of the frequency bands used for the single base station transmission.

In this way, base station 100 can flexibly change the ratio between the frequency bands used for the single base station transmission and the frequency bands used for the CoMP transmission in the system band in accordance with the number of cell edge terminals and the number of cell center terminals. Further, terminal 300 can specify the frequency bands used for the single base station transmission and the frequency bands used for the CoMP transmission based on the frequency band ratio supplied from base station 100. That is, terminal 300 can easily change the SINR measurement frequency bands (here, the frequency bands used for the single base station transmission) only when terminal 300 is notified of the frequency band ratio. That is, even when base station 100 sets the variable ratio (the frequency band ratio) between the frequency bands used for the single base station transmission and the frequency bands used for the CoMP transmission, terminal 300 can change only the bandwidth of the SINR measurement frequency bands in accordance with the frequency band ratio so as to measure the SINR and feed back information to base station 100, as in Embodiment 1.

In this embodiment, even when the ratio between the frequency bands used for the single base station transmission and the frequency bands used for the CoMP transmission is set to be variable, it is possible to improve the reception characteristics of the terminal located near the edge of the cell by reducing the amount of information fed back from the terminal to the base station and reducing the ICI, as in Embodiment 1.

In this embodiment, the frequency bands used for the single base station transmission and the frequency bands used for the CoMP transmission are set to be variable. Therefore, the base station can flexibly allocate the frequency bands of the signal transmitted by the single base station transmission and the signal transmitted by the CoMP transmission in accordance with the number of cell edge terminals and the number of cell center terminals. In this embodiment, the case has already been described in which the ratio between the frequency bands is determined in accordance with the number of cell edge terminals and the number of cell center terminals, but the invention is not limited thereto. In the invention, any configuration may be used as long as the ratio between the frequency bands can be determined based on a communication state between the base station and each terminal. For example, the ratio of the frequency bands may be determined based on only one of the number of cell edge terminals and the number of cell center terminals. In this case, for example, in a case where the ratio is determined based on only the number of cell edge terminals, the base station may enlarge the bandwidth for the CoMP transmission when the number of cell edge terminals is equal to or greater than a predetermined threshold value. On the other hand, the base station may narrow the bandwidth for the CoMP transmission when the number of cell edge terminals is less than the predetermined threshold value. The same is applied even when the ratio is determined based on only the number of cell center terminals. As an example of the communication state other than the number of terminals, a transmission rate or the like necessary for each communication scheme can be used. For example, when the transmission rate is intended to be increased in one transmission scheme of the single base station transmission and the CoMP transmission, it may be considered to enlarge the bandwidth for the transmission scheme in which the transmission rate is intended to be increased.

In this embodiment, the case has already been described in which the base station notifies the terminal of the control information including the frequency band ratio and the frequency positions, and then the terminal specifies the SINR measurement frequency bands based on the frequency band ratio and the frequency positions. In the invention, however, when the frequency band ratio is changed every time, the base station may notify the terminal of the SINR measurement frequency bands (in this embodiment, the frequency bands used for the single base station transmission) after the change in the frequency band ratio. Thus, as in Embodiment 1, the terminal can specify the SINR measurement frequency band just by referring to the control information from the base station.

In this embodiment, base station 100 (the master base station) notifies the terminal of the information regarding the frequency band ratio and the frequency positions as the control information indicating the frequency positions indicating the frequency bands used for each transmission scheme. However, the control information regarding the frequency positions indicating the frequency bands used for each transmission scheme is not limited thereto. For example, the master base station may notify the terminal of information indicating the frequency bandwidth for each transmission scheme, instead of the information indicating the frequency band ratio. Even in this case, base station 200 (the slave base station) and the terminal can set the ratio of the frequency bandwidth for each transmission scheme as being variable in response to the notification from the master base station. Accordingly, the same result as that of this embodiment can be obtained.

In this embodiment, base station 100 (the master base station) notifies the terminal and base station 200 (the slave base station) of the control information regarding the frequency positions indicating the frequency bands used for each transmission scheme. However, the method of sharing the information regarding the frequency positions between the master base station and the slave base station and the terminal is not limited thereto. For example, there is a known technique of classifying the system band into a central section (hereinafter, referred to as central frequency bands) of frequency bands to be used and another section (hereinafter, referred to as peripheral frequency bands), and fixing the bandwidth of the central frequency bands, whereas varying the bandwidth of the peripheral frequency bands. This technique is configured such that the central frequency bands are used to transmit information desired to be reliably received since there is a high possibility of obtaining a high communication quality, and the entire bandwidth can flexibly be changed by varying the bandwidth of the peripheral frequency bands used to transmit other information. In the technique, the central frequency bands can be used as the bands for the single base station transmission and the peripheral frequency bands can be used as the bands for the CoMP transmission. In this case, since the terminal and the base stations already know the positions and bandwidth of the bands for the single base station transmission, the information of which the master base station notifies the terminal and the slave base station may include only the ratio between the bandwidth of the frequency bands for the single base station transmission and the bandwidth of the frequency bands (that is, the peripheral frequency bands) for the CoMP transmission or the bandwidth of the peripheral frequency bands. Accordingly, it is possible to reduce the amount of control information of which the master base station notifies the terminal and the slave base station. In this example, the example has already been described in which the central frequency bands are used as the bandwidth for the single base station transmission. The same is applied even when the central frequency bands are used as the bandwidth for the CoMP transmission. In this embodiment, the bandwidth of the entire system band is fixed. However, in the case of the above-described modification, it is noted that the bandwidth of the entire system band which is the sum of the bandwidth of the fixed central frequency bands and the bandwidth of the variable peripheral frequency bands may, of course, be set to be variable.

Further, a bandwidth which includes the central frequency bands and is broader than the central frequency bands can be considered to be used as the bands for the single base station transmission or the CoMP transmission. In this case, the terminal and the slave base station already know the positions and bandwidth of the central frequency bands. Accordingly, the master base station can use information regarding the ratio of the bandwidths, the relative positions, or the like between the frequency bands and the central frequency bands for each transmission scheme, as information used to notify the terminal and the slave base station of the frequency bands for each transmission scheme. Even in this case, it is possible to be highly likely to reduce the amount of information to be transmitted compared to a case where the information itself indicating the set frequency band ratio and the set frequency positions is transmitted.

The embodiments of the invention have been described.

Figure 6:
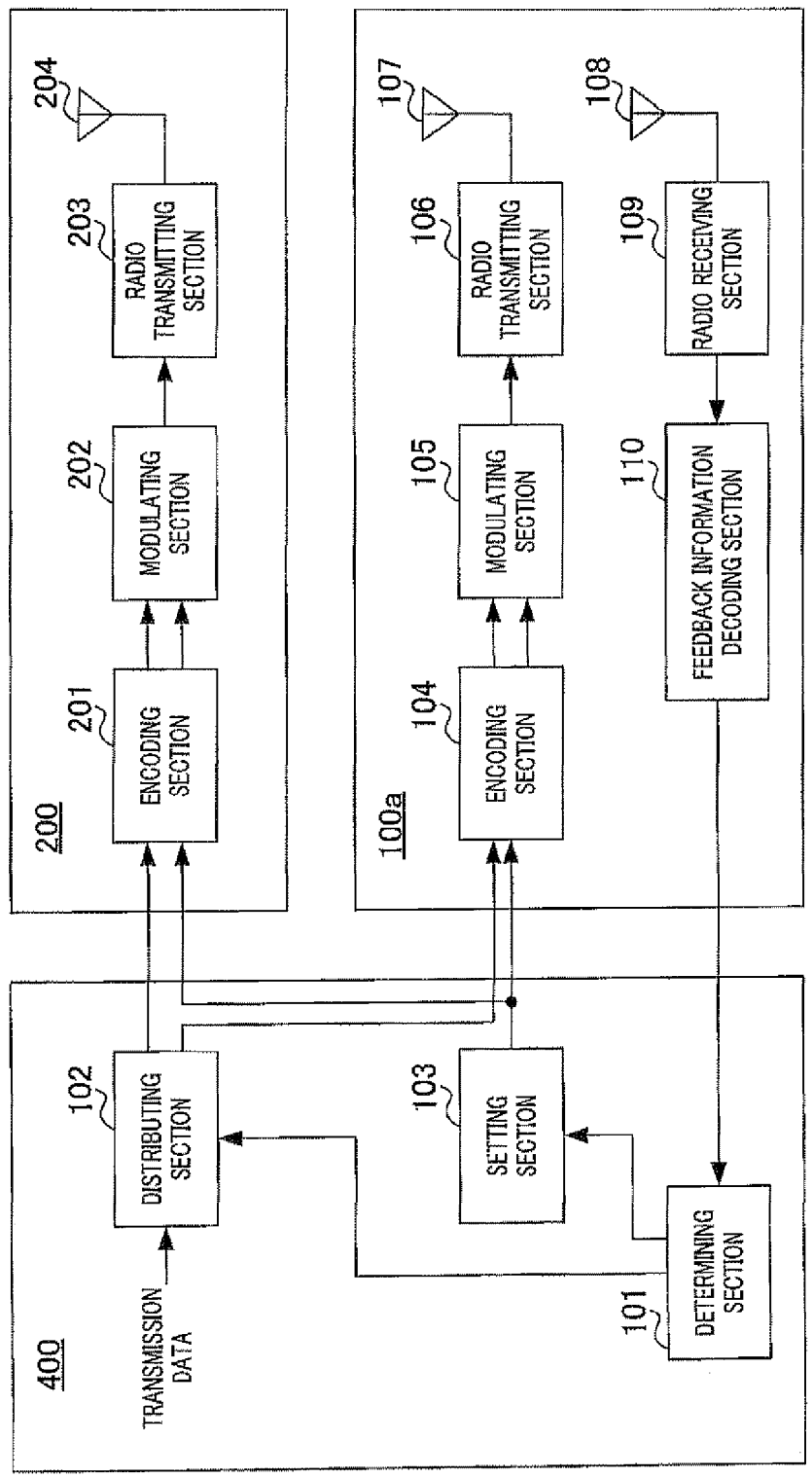
FIG. 6 is a block diagram illustrating the configurations of a base station control apparatus and a base station according to a variation of the invention.

In the above-described embodiments, as illustrated in FIGS. 1 and 2, the case has been described in which the master base station (base station 100) determines the single base station transmission or the CoMP transmission, and notifies the slave base station (base station 200) of the control information regarding the frequency bands allocated for the transmission data when the CoMP transmission is executed. In the invention, however, for example, a base station control apparatus (a radio network controller (RNC)) in an upper layer (not illustrated in FIG. 1) of the base station may execute some functions of the master base station (base station 100 illustrated in FIG. 2) according to this embodiment. Specifically, as illustrated in FIG. 6, base station control apparatus 400 includes determining section 101, distributing section 102, and setting section 103 in the sections of base station 100 (the master base station) illustrated in FIG. 2. Base station 100*a* includes sections (encoding section 104 to feedback information decoding section 110) among the sections of base station 100 (the master base station) illustrated in FIG. 2 other than the sections of base station control apparatus 400. Accordingly, in FIG. 6, determining section 101 of base station control apparatus 400 determines, as the transmission scheme of the terminal, one of the single base station transmission and the CoMP transmission based on the SINR information (for example, the SINR of terminal 300 (see FIG. 3)) included in the feedback information input from base station 100*a*. When determining section 101 of base station control apparatus 400 determines the CoMP transmission, determining section 101 determines base stations (base station 100*a* and base station 200 in FIG. 6) executing the CoMP transmission. Then, distributing section 102 of base station control apparatus 400 distributes the transmission data addressed to terminal 300, to base stations 100*a* and 200. Setting section 103 of base station control apparatus 400 notifies the plurality of base stations (base stations 100*a* and 200 in FIG. 6) of control information (the band allocation information, the frequency band ratio, or the like) regarding the frequency bands allocated for the transmission data, or control information regarding the SINR measurement frequency band. In the LTE, for example, base station control apparatus 400 notifies, of the control information, the plurality of base stations executing the CoMP transmission by using an inter-RNC base station interface called an S1 interface (S1 I/F). Then, base stations 100*a* and 200 illustrated in FIG. 6 execute the CoMP transmission for terminal 300. In this way, since the base station control apparatus controls the frequency band allocation, the transmission scheme, and the like, it is possible to obtain the same advantages as those described above in the embodiments even when each base station is notified of the control information.

In the above-described embodiments, the case has been described in which the system band is completely divided into the frequency bands used for the single base station transmission and the frequency bands used for the CoMP transmission. In the invention, however, the system band is not completely divided into the frequency bands used for the single base station transmission and the frequency bands used for the CoMP transmission, but may be partially overlapped. In the invention, for example, the system band may be classified into frequency bands preferentially used for the single base station transmission and frequency bands preferentially used for the CoMP transmission. Thus, for example, when there is no terminal executing the CoMP transmission, the base station may use the frequency bands preferentially used for the CoMP transmission to transmit the transmission data addressed to the terminal executing the single base station transmission. In this way, the base station can flexibly allocate the transmission data by using the entire system band.

In the above-described embodiments, the case has already been described in which the frequency bands used for the single base station transmission are set as the SINR measurement frequency bands. In the invention, however, the SINR measurement frequency bands may not be completely the same as the frequency bands used for the single base station transmission. As described in the above-described embodiments, for example, the frequency bands used for the single base station transmission and the frequency bands used for the CoMP transmission are set in the sub-carrier unit. That is, the variable grain size of each frequency band is the sub-carrier unit. On the other hand, the variable grain size of the SINR measurement frequency band is limited to, for example, 1.25 MHz, 2.5 MHz, 5 MHz, 10 MHz, and 20 MHz, in some cases. In the invention, accordingly, when the variable grain size of the SINR measurement frequency bandwidth is greater than the variable grain size (in this embodiment, the sub-carrier unit) of the bandwidth of the frequency bands used for the single base station transmission and the frequency bands used for the CoMP transmission, the SINR measurement frequency bandwidth which is the closest to the bandwidth of the frequency bands used for the single base station transmission may be selected from among the plurality of SINR measurement frequency bandwidths.

In the above-described embodiments, the case has been described in which the frequency bands used for the single base station transmission are set as the SINR measurement frequency bands. In this embodiment, however, the frequency bands used for the CoMP transmission may be set as the SINR measurement frequency bands. That is, the terminal measures the SINR of only the frequency bands used for the CoMP transmission and feeds back information regarding the measured SINR, as SINR information, to the base station. Then, the base station distinguishes whether to apply the CoMP transmission or the single base station transmission to the terminal based on the SINR information fed back from the terminal. For example, when the SINR indicated by the SINR information exceeds a predetermined threshold value, the base station executes the CoMP transmission. When the SINR does not exceed the predetermined threshold value, the base station executes the single base station transmission. Even in this case, as described in the above-described embodiments, it is possible to improve the reception characteristics of the terminal located near the edge of the cell by reducing the amount of information fed back from the terminal to the base station as well as the ICI.

In the invention, the frequency bands used for the CoMP transmission and the frequency bands used for the single base station transmission may separately be set as the SINR measurement frequency bands. That is, the terminal may independently measure the SINR of the frequency bands used for the CoMP transmission and the SINR of the frequency bands used for the single base station transmission and may give two pieces of SINR, information as feedback information to the base station. Even in this case, it is possible to reduce the amount of feedback information by setting the SINR information as information regarding the average SINR of the frequency bands. Further, in this case, since the terminal supplies the SINR information regarding both frequency bands, it is not necessary to set which frequency bands are used to measure the reception quality. When the base station receives the two pieces of SINR information as the feedback information, the base station determines the transmission scheme to be used by using the both SINR information. For example, the base station uses the communication scheme having the better reception quality indicated by the SINR information.

In the invention, the value of the information fed back as the SINR information is not limited to the average SINR, but other values such as a median value of the SINRs of the respective sub-carriers may be used. That is, information representing the reception quality of the bands set for the SINR measurement frequency bands may be used.

Figure 7:
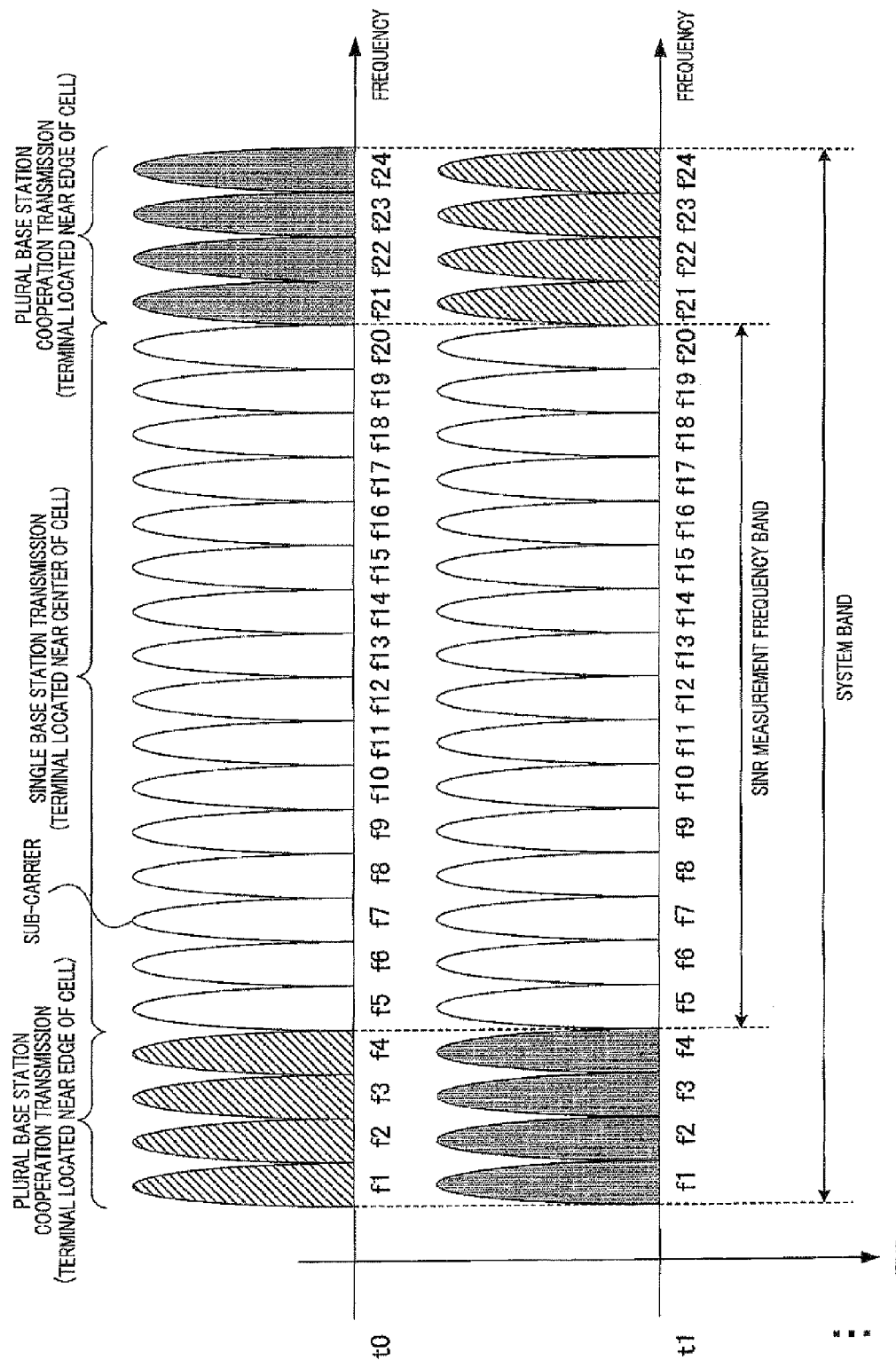
FIG. 7 is a diagram illustrating a system band according to a variation of the invention.

In the invention, for example, the frequency bands (the sub-carriers or the resource blocks) used for the CoMP transmission illustrated in FIGS. 4 and 5 may be subjected to frequency hopping at a period of a transmission time unit. For example, in the frequency bands used for the CoMP transmission, four sub-carriers at the end of the low frequency side and four sub-carriers at the end of the high frequency side of the system band may be interchanged for transmission time units t0, t1, . . . , as illustrated in FIG. 7. That is, signals allocated to sub-carriers f1 to f4 in the transmission time unit t0 illustrated in FIG. 7 can be allocated to sub-carriers f21 to f24 in the transmission time unit t1. Likewise, signals allocated to sub-carriers f21 to f24 in the transmission time unit t0 illustrated in FIG. 7 can be allocated to sub-carriers f1 to 14 in the transmission time unit t1. In this way, the same may be repeatedly applied to the transmission time units (t2, t3, t4, . . . ) (not illustrated) subsequent to the transmission time unit t1, as in the transmission time units t0 and t1 illustrated in FIG. 7. Thus, in the terminal (the terminal located near the edge of the cell) to which the CoMP transmission is applied, the frequency diversity effect can be obtained, thereby improving the reception characteristics of the terminal. Here, a sub-frame unit, a unit of the first half and second half of the sub-frame, or an OFDM symbol unit may be used as the transmission time unit. Whether the interchange of the frequency bands is executed may be set in advance between the base station and the terminal or may be supplied as control information from the base station to the terminal.

In the above-described embodiments, as illustrated in FIGS. 4, 5, and 7, the case has been described in which the frequency bands used for the single base station transmission are set in the middle of the system band and the frequency bands used for the CoMP transmission are set at both ends (that is, both ends of the frequency bands used for the single base station transmission) of the system band. In the invention, however, the frequency positions of the frequency bands used for the single base station transmission and the frequency bands used for the CoMP transmission are not limited to the frequency positions illustrated in FIGS. 4, 5, and 7. For example, any frequency positions may be used when different frequency positions are set (that is, frequency-divided).

In the invention, the terminal may notify the base station of the SINR information periodically or may notify the base station of the SINR information when the SINR information is equal to or greater (or less) than a preset threshold value. Alternatively, the terminal may notify the base station of the SINR information when an instruction is given from the base station. Alternatively, the terminal may notify the base station of the SINR information, when the reception power of a signal from the master base station (the serving cell) is equal to or greater (or less) than the reception power of a signal from the slave base station (the neighbor cell).

In the invention, the control information (the SINR measurement frequency bands, the frequency band ratio, or the like) to be transmitted by the base station may be included in announcement information or control information for each terminal to be notified to the terminal.

In Embodiments 1 and 2, the SINR is used as the reception quality, but reference signal received quality (RSRQ) or reference signal received power (RSRP) may be used.

In Embodiments 1 and 2, the terminal feeds back the information regarding the average SINR of the frequency bands to be measured, but the invention is not limited thereto. When detailed information is necessary, the terminal may feed back information regarding the SINR of each sub-carrier belonging to the frequency bands to be measured. Even in this case, since the feedback information is restricted to the quality information of the frequency bands to be measured, it is possible to reduce the amount of information compared to the case where the SINR of each sub-carrier of all the frequency bands is fed back.

The present invention contains the disclosures of the specifications, the drawings, and the abstracts of Japanese Patent Application No. 2009-212261 filed in the Japanese Patent Office on Sep. 14, 2009, the entire contents of which being incorporated herein by reference.

INDUSTRIAL APPLICABILITY

The invention is applicable to radio communication systems such as a cellular system.

REFERENCE SIGNS LIST 100, 100a, 200 base station
300 terminal
400 base station control apparatus
101 determining section
102 distributing section
103 setting section
104, 201 encoding section
105, 202 modulating section
106, 203, 308 radio transmitting section
107, 108, 204, 301, 309 antenna
109, 302 radio receiving section
110 feedback information decoding section
303 channel separating section
304 control information decoding section
305 demodulating section
306 decoding section
307 measuring section

The invention claimed is:

1. A radio base station apparatus communicating with each of one or more radio terminal apparatuses using one of a first transmission scheme, in which a signal is transmitted only by the radio base station apparatus, and a second transmission scheme, in which the signal is transmitted by the radio base station apparatus in coordination with another radio base station apparatus, the radio base station apparatus comprising:

a setting section that sets a part of frequency bands of a system band used to communicate with the radio terminal apparatus as first frequency bands used for the first transmission scheme, sets the rest of the frequency bands of the system band as second frequency bands used for the second transmission scheme so as to variably allocate all of the frequency bands of the system band between the first frequency bands and the second frequency bands, sets the first frequency bands used for the first transmission scheme as specific frequency bands for measuring a reception quality, and generates control information including information indicating the specific frequency;

a transmitting section that transmits the control information to the radio terminal apparatus;

a receiving section that receives a single piece of quality information summarizing the reception quality of all of the specific frequency bands in a single value from the radio terminal apparatus receiving the control information as to the set specific frequency bands; and a determining section that determines whether the radio terminal apparatus is a cell center terminal apparatus or a cell edge terminal apparatus, based on the reception quality indicated by the single value of the received single piece of quality information, wherein when the determining section determines that the radio terminal apparatus is the cell center terminal apparatus, the radio base station apparatus communicates with the radio terminal apparatus by the first transmission scheme, and when the determining section determines that the radio terminal apparatus is the cell edge terminal apparatus, the radio base station apparatus communicates with the radio terminal apparatus by the second transmission scheme.

2. The radio base station apparatus according to claim 1, wherein the receiving section receives one piece of quality information indicating the reception quality of all the specific frequency bands from the radio terminal apparatus, and wherein the determining section determines whether the radio terminal apparatus is a cell center terminal apparatus or a cell edge terminal apparatus using the one piece of quality information received from the radio terminal apparatus.

3. The radio base station apparatus according to claim 1, wherein the setting section changes a ratio between a bandwidth of the first frequency bands and a bandwidth of the second frequency bands in the system band, depending on a communication state with one or more radio terminal apparatuses.

4. The radio base station apparatus according to claim 3, wherein the setting section changes the ratio between the bandwidth of the first frequency bands and the bandwidth of the second frequency bands, based on at least one of the number of the cell center terminal apparatuses and the number of the cell edge terminal apparatuses.

5. The radio base station apparatus according to claim 1, wherein the setting section notifies the control information to the other base station serving as a slave base station.

6. A radio base station apparatus according to claim 1, wherein the single piece of quality information indicates an average of the reception quality of the specific frequency bands.

7. The radio base station apparatus according to claim 1, wherein:

the setting section further sets the second frequency bands used for the second transmission scheme as another specific frequency bands for measuring another reception quality, and the receiving section further receives another single piece of quality information summarizing the another reception quality of all of the second frequency bands, in a single value.

8. A radio base station apparatus communicating with each of one or more radio terminal apparatuses using one of a first transmission scheme, in which a signal is transmitted only by the radio base station apparatus, and a second transmission scheme, in which the signal is transmitted by the radio base station apparatus in coordination with another radio base station apparatus, the radio base station apparatus comprising:

a setting section that sets a part of frequency bands of a system band used to communicate with the radio terminal apparatus as first frequency bands used for the first transmission scheme, sets the rest of the frequency bands of the system band as second frequency bands used for the second transmission scheme so as to variably allocate all of the frequency bands of the system band between the first frequency bands and the second frequency bands, sets the first frequency bands used for the first transmission scheme as first specific frequency bands for measuring a first reception quality, sets the second frequency bands used for the second transmission scheme as second specific frequency bands for measuring a second reception quality, and generates control information including information indicating the first frequency bands and the second frequency bands;

a transmitting section that transmits the control information to the radio terminal apparatus;

a receiving section that receives a single piece of first quality information summarizing the first reception quality of all of the first frequency bands in a single value and a single piece of second quality information summarizing the second reception quality of all of the second frequency bands in a single value from the radio terminal apparatus receiving the control information, as to the set first frequency bands and the set second frequency bands; and a determining section that determines whether the radio terminal apparatus is a cell center terminal apparatus or a cell edge terminal apparatus, based on the first reception quality indicated by the single value of the received single piece of first quality information and the second reception quality indicated by the single value of the received second quality information, wherein when the determining section determines that the radio terminal apparatus is the cell center terminal apparatus, the radio base station apparatus communicates with the radio terminal apparatus by the first transmission scheme, and when the determining section determines that the radio terminal apparatus is the cell edge terminal apparatus, the radio base station apparatus communicates with the radio terminal apparatus by the second transmission scheme.

9. A radio communication method in a radio base station apparatus communicating with each of one or more radio terminal apparatuses using one of a first transmission scheme, in which a signal is transmitted only by the radio base station apparatus, and a second transmission scheme, in which the signal is transmitted by the radio base station apparatus in coordination with another radio base station apparatus, the radio communication method comprising:
- setting a part of frequency bands of a system band used to communicate with the radio terminal apparatus as first frequency bands used for the first transmission scheme,
- setting the rest of the frequency bands of the system band as second frequency bands used for the second transmission scheme so as to variably allocate all of the frequency bands of the system band between the first frequency bands and the second frequency bands,
- setting the first frequency bands used for the first transmission scheme as specific frequency bands for measuring a reception quality, and
- generating control information including information indicating the specific frequency;
- transmitting the control information to the radio terminal apparatus;
- receiving a single piece of quality information summarizing the reception quality of all of the specific frequency bands in a single value from the radio terminal apparatus, as to the set specific frequency bands; and
- determining whether the radio terminal apparatus is a cell center terminal apparatus or a cell edge terminal apparatus, based on the reception quality indicated by the single value of the received single piece of quality information,
- wherein when the determining section determines that the radio terminal apparatus is the cell center terminal apparatus, the radio base station apparatus communicates with the radio terminal apparatus by the first transmission scheme, and when the determining section determines that the radio terminal apparatus is the cell edge terminal apparatus, the radio base station apparatus communicates with the radio terminal apparatus by the second transmission scheme.

* * * * *